(12) United States Patent
Liu et al.

(10) Patent No.: US 12,298,631 B2
(45) Date of Patent: May 13, 2025

(54) ELECTRODE FOR DISPLAY, DISPLAY SUBSTRATE, AND DISPLAY DEVICE

(71) Applicants: Beijing BOE Display Technology Co., Ltd., Beijing (CN); BOE TECHNOLOGY GROUP CO., LTD., Beijing (CN)

(72) Inventors: Yong Liu, Beijing (CN); Jiao Li, Beijing (CN); Xiaoqing Peng, Beijing (CN); Kaixuan Wang, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/605,284

(22) Filed: Mar. 14, 2024

(65) Prior Publication Data

US 2024/0219781 A1 Jul. 4, 2024

Related U.S. Application Data

(63) Continuation of application No. 17/428,857, filed as application No. PCT/CN2020/123138 on Oct. 23, 2020, now Pat. No. 11,947,226.

(51) Int. Cl.
*G02F 1/1343* (2006.01)
(52) U.S. Cl.
CPC .... *G02F 1/134309* (2013.01); *G02F 1/13439* (2013.01)
(58) Field of Classification Search
None
See application file for complete search history.

(56) References Cited

U.S. PATENT DOCUMENTS

2005/0179844 A1* 8/2005 Roosendaal .......... G02F 1/1391
349/139
2006/0146243 A1* 7/2006 Nakanishi ......... G02F 1/133711
349/139

(Continued)

FOREIGN PATENT DOCUMENTS

CN 104570514 A 4/2015
CN 106019750 A 10/2016

(Continued)

OTHER PUBLICATIONS

WIPO, ISR of PCT-CN2020-123138 dated Jun. 28, 2021.

(Continued)

*Primary Examiner* — Ryan Crockett
(74) *Attorney, Agent, or Firm* — HOUTTEMAN LAW LLC

(57) ABSTRACT

An electrode for display includes at least two display electrodes arranged at intervals along first direction, each including a body electrode and an end electrode; the at least two display electrodes include first and second display electrodes, body electrodes of the first and second display electrodes being parallel in first direction with a first preset pitch; among two side edges of the end electrode of the first display electrode opposite in first direction and two side edges of the end electrode of the second display electrode opposite in first direction, at least two side edges are unparallel; a minimum distance in first direction between one side edge of the end electrode of the first display electrode close to the second display electrode and one side edge of the end electrode of the second display electrode close to the first display electrode is greater than or equal to first preset pitch.

14 Claims, 8 Drawing Sheets

(56) References Cited

U.S. PATENT DOCUMENTS

| | | | | |
|---|---|---|---|---|
| 2009/0201449 | A1* | 8/2009 | Nishida | G02F 1/134363 349/114 |
| 2012/0044446 | A1* | 2/2012 | Hara | G02F 1/134309 445/24 |
| 2012/0162589 | A1* | 6/2012 | Yoso | G02F 1/134309 349/126 |
| 2012/0218501 | A1* | 8/2012 | Lee | G02F 1/134309 349/139 |
| 2012/0307190 | A1* | 12/2012 | Zhang | G02F 1/133707 349/142 |
| 2013/0021570 | A1* | 1/2013 | Zhang | G02F 1/133707 349/139 |
| 2013/0100384 | A1 | 4/2013 | Asakawa et al. | |
| 2014/0098317 | A1* | 4/2014 | Jung | G02F 1/13439 349/43 |
| 2015/0160520 | A1* | 6/2015 | Matsushima | G02F 1/134309 349/123 |
| 2015/0163968 | A1* | 6/2015 | Lee | G02F 1/133707 427/532 |
| 2017/0146861 | A1* | 5/2017 | Takeshita | G02F 1/134363 |
| 2021/0132449 | A1* | 5/2021 | Shao | G02F 1/134309 |

FOREIGN PATENT DOCUMENTS

| | | |
|---|---|---|
| CN | 107290902 A | 10/2017 |
| CN | 110737141 A | 1/2020 |
| CN | 111176034 A | 5/2020 |

OTHER PUBLICATIONS

USPTO, Office action issued on Mar. 27, 2023 regarding U.S. Appl. No. 17/428,857.
USPTO, final Office action issued on Aug. 7, 2023 regarding U.S. Appl. No. 17/428,857.
USPTO, Advisory Action issued on Oct. 24, 2023 regarding U.S. Appl. No. 17/428,857.
USPTO, Notice of Allowance issued on Dec. 1, 2023 regarding U.S. Appl. No. 17/428,857.

* cited by examiner

ELECTRODE FOR DISPLAY, DISPLAY SUBSTRATE, AND DISPLAY DEVICE

TECHNICAL FIELD

The present disclosure relates to the field of display, and in particular, to an electrode for display, a display substrate, and a display device.

BACKGROUND

In the field of liquid crystal display technology, fringe field switching (FFS) technology includes two commonly used wide-viewing-angle liquid crystal display technologies. As the characteristics of the two technologies, a pixel electrode and a common electrode are arranged on the same substrate, so that liquid crystal molecules rotate in a plane parallel to the substrate, thereby improving the light transmission efficiency of a liquid crystal layer. However, in practical applications, it is found that the conventional FFS-type display device has a problem of obvious trace mura.

SUMMARY

The present disclosure is directed to solve at least one of the problems in the prior art, and provides an electrode for display, a display substrate, and a display device.

In a first aspect, an embodiment of the present disclosure provides an electrode for display, including: at least two display electrodes arranged at an interval along a first direction and a first connection electrode connected with one end of each display electrode, the display electrodes each including a body electrode and an end electrode, one end of the body electrode being connected with the first connection electrode, and the other end of the body electrode being connected with the end electrode;

the at least two display electrodes include: a first display electrode and a second display electrode, the body electrode of the first display electrode being parallel to the body electrode of the second display electrode in the first direction with a first preset pitch;

among two side edges of the end electrode of the first display electrode that are opposite in the first direction and two side edges of the end electrode of the second display electrode that are opposite in the first direction, at least two side edges are unparallel; and a minimum distance in the first direction between one side edge of the end electrode of the first display electrode close to the second display electrode and one side edge of the end electrode of the second display electrode close to the first display electrode is greater than or equal to the first preset pitch.

In some embodiments, the at least two display electrodes further include a third display electrode, and the second display electrode and the third display electrode are at different sides of the first display electrode, respectively;

the body electrode of the first display electrode and the body electrode of the third display electrode are parallel in the first direction with a second preset pitch;

among two side edges of the end electrode of the first display electrode that are opposite in the first direction and two side edges of the end electrode of the third display electrode that are opposite in the first direction, at least two side edges are unparallel; and a minimum distance between one side edge of the end electrode of the first display electrode close to the third display electrode and one side edge of the end electrode of the third display electrode close to the first display electrode in the first direction is greater than or equal to the second preset pitch.

In some embodiments, a shape of the end electrode of the second display electrode and a shape of the end electrode of the third display electrode are axisymmetric with respect to an axis of symmetry extending in a second direction, the second direction being perpendicular to the first direction.

In some embodiments, the end electrode of the first display electrode has a shape that is an axisymmetric pattern with respect to an axis of symmetry extending in the second direction; and the shape of the end electrode of the second display electrode and the shape of the end electrode of the third display electrode are axisymmetric with respect to the axis of symmetry of the end electrode of the first display electrode.

In some embodiments, a distance, in the first direction, between a side edge of the end electrode of the first display electrode close to the second display electrode and a side edge of the end electrode of the second display electrode close to the first display electrode gradually increases in a direction away from the body electrodes of the first and second display electrodes; and a distance, in the first direction, between a side edge of the end electrode of the first display electrode close to the third display electrode and a side edge of the end electrode of the third display electrode close to the first display electrode gradually increases in a direction away from the body electrodes of the first and third display electrodes.

In some embodiments, the end electrode of the first display electrode is a bar-shaped electrode, and a width of the end electrode of the first display electrode in the first direction is constant or gradually reduced in a direction away from the body electrode along the second direction.

In some embodiments, the end electrode of the first display electrode has a shape of rectangle, inverted trapezoid, or inverted triangle.

In some embodiments, the end electrodes of the second display electrode and the third display electrode are bar-shaped electrodes each having a center line that is a line segment or an arc.

In some embodiments, the center line of each of the end electrodes of the second and third display electrodes is a line segment whose extending direction intersects the second direction.

In some embodiments, a width of each of the end electrodes of the second and third display electrodes in the first direction is constant or gradually decreased in a direction away from the body electrodes of the second and third display electrodes along the second direction.

In some embodiments, the at least two display electrodes further include at least one fourth display electrode having the same shape as the second display electrode and at least one fifth display electrode having the same shape as the third display electrode; and the fourth display electrode is at a side of the second display electrode away from the first display electrode, and the fifth display electrode is at a side of the third display electrode away from the first display electrode.

In some embodiments, the number of the at least one fourth display electrode is equal to the number of the at least one fifth display electrode, and the at least one fourth display electrode and the at least one fifth display electrode are axisymmetric with respect to the axis of symmetry of the end electrode of the first display electrode.

In some embodiments, the electrode for display is an electrode for liquid crystal display.

In some embodiments, in a same display electrode, a boundary of the end electrode close to one end of the body electrode and a boundary of the body electrode close to one end of the end electrode completely overlap.

In some embodiments, portions, which are away from the body electrodes of adjacent two of the display electrodes, of the end electrodes of the adjacent two of the display electrodes are formed as an opening.

In some embodiments, a second connection electrode is arranged between portions, which are away from the body electrodes, of the end electrodes of adjacent two of the display electrodes, and the second connection electrode is connected with one ends of the end electrodes away from the body electrodes.

In a second aspect, an embodiment of the present disclosure further provides a display substrate, including: a base substrate, a first electrode and a second electrode, the second electrode being at a side of the first electrode away from the base substrate and being the electrode for display according to the first aspect; and
one of the first electrode and the second electrode is a common electrode, and the other is a pixel electrode.

In a third aspect, an embodiment of the present disclosure further provides a display device, including: the display substrate provided in the second aspect, a counter substrate arranged opposite to the display substrate, and a liquid crystal layer between the display substrate and the counter substrate.

DETAIL DESCRIPTION OF EMBODIMENTS

To make those skilled in the art better understand the technical solutions of the present disclosure, an electrode for display, a display substrate, and a display device according to the present disclosure will be described in detail below in conjunction with the accompanying drawings.

The trace mura test is an important test project for evaluating the performance of a display device, and the specific test process is as follows: firstly, a liquid crystal display panel is lit to present a preset test gray-scale brightness (generally, the maximum gray-scale brightness L255 of the display device); then, the liquid crystal display panel is pressed strongly or slid to change the cell gap of the liquid crystal panel, resulting in a disordered arrangement of liquid crystal molecules and a reduced brightness of a corresponding position; thereafter, it is detected whether the brightness of the corresponding position can be restored within a predetermined time (e.g., 2 seconds). If the brightness of the corresponding position cannot be restored to the preset test gray-scale brightness within the predetermined time, it is indicated that there is an obvious trace mura problem of the liquid crystal display panel. In general, the shorter the time during which the brightness of the corresponding position is restored to the preset test gray-scale brightness, the better the performance of the liquid crystal display panel in terms of trace Mura. The techniques of the present disclosure may be adopted to alleviate trace mura in a liquid crystal display panel.

Figure 1:
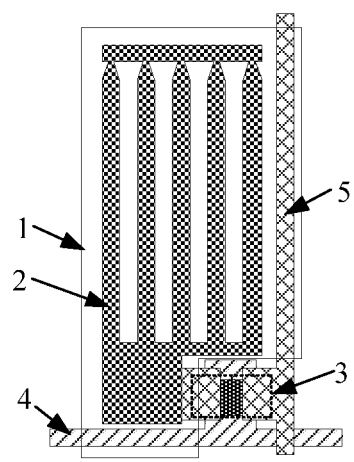
FIG. 1 is a top view of a pixel region in a display substrate according to an embodiment of the present disclosure.
Figure 2:
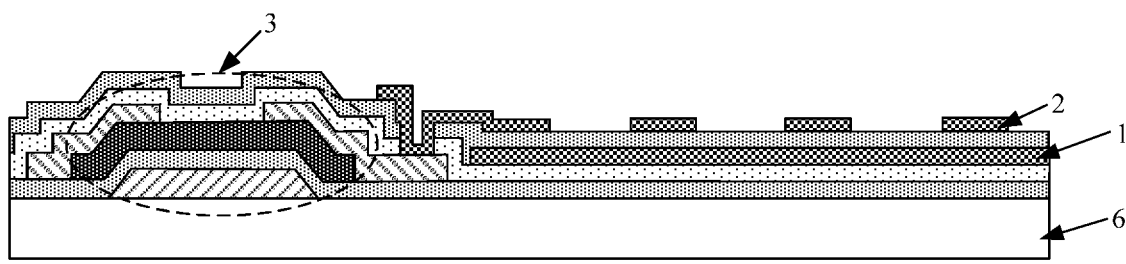
FIG. 2 is a cross-sectional view of the pixel region shown in FIG. 1.

FIG. 1 is a top view of a pixel region in a display substrate according to an embodiment of the present disclosure, and FIG. 2 is a cross-sectional view of the pixel region shown in FIG. 1. As shown in FIGS. 1 and 2, the display substrate includes a base substrate 6, and a gate line 4 and a data line 5 on the base substrate 6, the gate line 4 and the data line 5 define a pixel region in which a thin film transistor 3, a first electrode 1 and a second electrode 2 are arranged. One of the first electrode 1 and the second electrode 2 is a common electrode, and the other is a pixel electrode; a gate electrode of the thin film transistor 3 is electrically coupled to the gate line 4, a source electrode of the thin film transistor 3 is electrically coupled to the data line 5, a drain electrode of the thin film transistor 3 is electrically coupled to the pixel electrode, and the common electrode is electrically coupled to a common voltage line (also referred to as a Vcom line, not shown in the drawings).

In the case shown in FIG. 1, the first electrode 1 is the common electrode, the second electrode 2 is the pixel electrode, the pixel electrode is at a side of the common electrode away from the base substrate 6, and the pixel electrode is a slit electrode. The liquid crystal deflection between the common electrode and the pixel electrode is controlled through the edge field effect so as to realize gray scale control.

It should be noted that, the case where the pixel electrode is at the side of the common electrode away from the base substrate 6 shown in the drawings is only for illustration and does not limit the technical solution of the present disclosure. In some embodiments, the common electrode may also be at a side of the pixel electrode away from the base substrate 6, and in this case, the common electrode is a slit electrode.

In addition, in the description of the present disclosure, a "shape" of an electrode or a certain portion of the electrode specifically indicates a cross-sectional shape of the electrode or the portion thereof in a cross section parallel to the base substrate 6.

Figure 3:
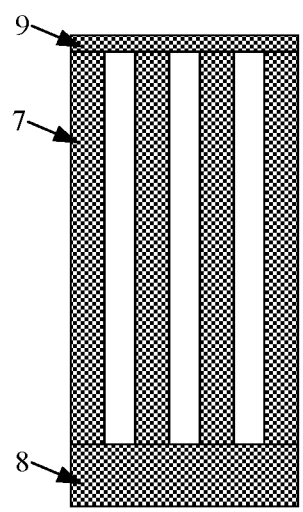
FIG. 3 is a top view of a slit electrode in the related art.

FIG. 3 is a top view of a slit electrode in the related art. As shown in FIG. 3, the slit electrode in the related art includes: at least two display electrodes 7 arranged at an interval along a first direction, a first connection electrode 8 connected to one end of the display electrode 7, and a second connection electrode 9 connected to the other end of the display electrode 7. The line width (i.e., width in the first direction) of the first connection electrode 8 is much greater than the line width of the second connection electrode 9, and the display electrode 7 is a bar-shaped electrode and rectangular in overall shape.

In a case where the pixel electrode is a slit electrode, the first connection electrode 8 in the slit electrode is usually configured to be coupled to the drain electrode in the thin film transistor; and in a case where the common electrode is a slit electrode, the first connection electrode 8 of the slit electrode is usually configured to be coupled to the common voltage line.

Figure 4:
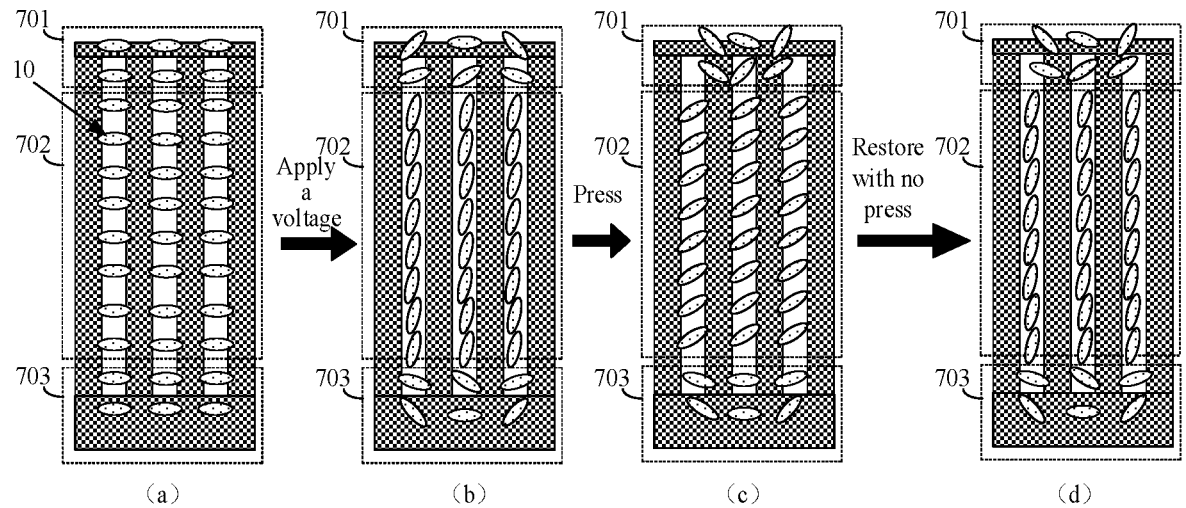
FIG. 4 is a schematic diagram illustrating an analysis of the mechanism of the trace mura problem according to an embodiment of the present disclosure.

FIG. 4 is a schematic diagram illustrating the analysis of the mechanism of the trace mura problem according to an embodiment of the present disclosure. As shown in FIG. 4, referring to part (a) of FIG. 4, when no voltage is applied to the common electrode and the pixel electrode, the liquid crystal molecules 10 are in a horizontal initial state; referring to part (b) of FIG. 4, when voltages are applied to the common electrode and the pixel electrode to control the pixel region to present the preset test gray-scale brightness, a middle high-field-strength region 702 and end low-field-strength regions 701 and 703 are produced in the pixel region, where the deflection angle of the liquid crystal molecules 10 in the middle high-field-strength region 702 is large, and the deflection angle of the liquid crystal molecules 10 in the end low-field-strength regions 701 and 703 is small; referring to part (c) of FIG. 4, when subjected to the trace mura press test, the liquid crystal molecules 10 in the middle high-field-strength region 702 and the end low-field-strength regions are deflected; referring to part (d) of FIG. 4, when a predetermined time has elapsed after the pressing is finished, most of the liquid crystal molecules 10 in the middle high-field-strength region 702 and the end low-field-strength region 703 corresponding to the side of the first connection electrode 8 are restored to the state in the case where the preset test gray-scale brightness is presented as shown in part (b) of FIG. 4, while most of the liquid crystal molecules 10 in the end low-field-strength region 701 corresponding to the side of the second connection electrode 9 cannot be restored to the state in the case where the preset test gray-scale brightness is presented as shown in part (b) of FIG. 4, thereby leading to trace mura.

Analysis shows that the reason for the occurrence of trace mura in the end low-field-strength region 701 corresponding to the side of the second connection electrode 9 is as follows: the electric field in the end low-field-strength region 701 corresponding to the side of the second connection electrode 9 has a non-uniform field strength and distributes irregularly, so that the liquid crystal molecules 10 are arranged in a disordered manner, and the liquid crystal molecules 10 in the end low-field-strength region 701 are defected in different directions when subjected to the trace mura pressing test, and thus, the liquid crystal molecules 10 are liable to accumulate to be in a stable state, and it is hard for the accumulated liquid crystal molecules 10 to loosen themselves and release space, resulting in that the restoring after pressing is slow or the liquid crystal molecules 10 cannot be restored to the prior-to-pressing state. In the embodiment(s) of the present disclosure, the structure of the slit electrode is improved based on the analysis result of the mechanism of trace mura, which can effectively alleviate trace mura.

Figure 5:
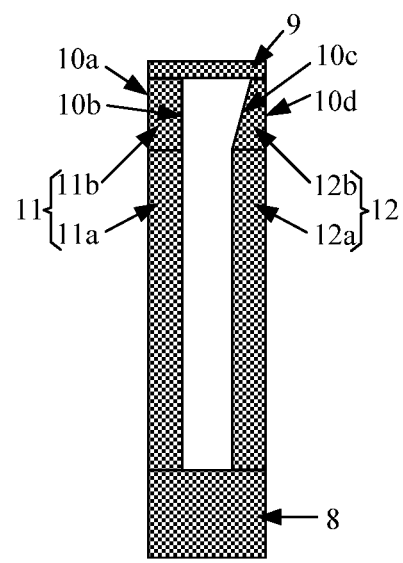
FIG. 5 is a top view of an electrode for display according to an embodiment of the present disclosure.

FIG. 5 is a top view of an electrode for display according to an embodiment of the present disclosure. As shown in FIG. 5, the electrode for display is a slit electrode, the display electrode includes at least two display electrodes 11, 12 arranged at an interval in a first direction and a first connection electrode 8 connected to one ends of the display electrodes 11, 12, the display electrodes 11, 12 include body electrodes 11a, 12a and end electrodes 11b, 12b, one ends of the body electrodes 11a, 12a are connected to the first connection electrode 8, and the other ends of the body electrodes 11a, 12a are connected to the end electrodes 11b, 12b.

The at least two display electrodes include a first display electrode 11 and a second display electrode 12, the body electrode 11a of the first display electrode 11 is parallel to the body electrode 12a of the second display electrode 12 in the first direction with a first preset pitch. Among two side edges 10a, 10b of the end electrode 11b of the first display electrode 11 that are opposite in the first direction and two side edges 10c, 10d of the end electrode 12b of the second display electrode 12 that are opposite in the first direction, at least two side edges of the four side edges 10a, 10b, 10c, 10d are unparallel. A minimum distance between one side edge 10b of the end electrode 11b of the first display electrode 11 close to the second display electrode 12 and one side edge 10c of the end electrode 12b of the second display electrode 12 close to the first display electrode 11 in the first direction is greater than or equal to the first preset pitch.

In some embodiments, the electrode for display is an electrode for liquid crystal display, and may be used as a common electrode or a pixel electrode in a liquid crystal display panel.

In the embodiment of the present disclosure, among the two side edges 10a, 10b of the end electrode 11b of the first display electrode 11 that are opposite in the first direction and the two side edges 10c, 10d of the end electrode 12b of the second display electrode 12 that are opposite in the first direction, at least two side edges of the four side edges 10a, 10b, 10c, 10d are unparallel. Therefore, it is not possible for all of the four side edges to be line segments extending in the first direction, and thus at least one side edge of the four side edges necessarily forms a corner with a side edge of the body electrode connected to the at least one side edge and at the same side of the at least one side edge. This corner design can lead to a smooth change of the deflection directions of the liquid crystal molecules in the area where the end electrode is located, and the deflection directions of the liquid crystal molecules are less liable to vary sharply; when the area where the end electrode is located is pressed, the deflection directions of the liquid crystal molecules in the area tend to be consistent, thereby avoiding the problem of liquid crystal accumulation; after the pressing is finished, the liquid crystal molecules in the area can quickly loosen themselves and release space, and the liquid crystal molecules can be rapidly restored to the prior-to-pressing state. It can thus be seen that the technical solution disclosed by the invention can effectively alleviate trace mura.

Take the first direction as the horizontal direction in the drawings and the second direction as the vertical direction in the drawings as an example. Referring to FIG. 5, the left side edge 10a and the right side edge 10b of the end electrode 11b of the first display electrode 11 are line segments whose extending directions are parallel to the second direction; the left side edge 10c of the end electrode 12b of the second display electrode 12 is a line segment whose extending direction intersects the second direction, and the right side edge 10d of the end electrode 12b of the second display electrode 12 is a line segment whose extending direction is parallel to the second direction. That is, the side edge 10c is not parallel to the other three side edges 10a, 10b, 10d; the left side edge 10c of the end electrode 12b of the second display electrode 12 forms a corner with the left side edge of the body electrode 12a of the second display electrode 12.

Figure 6:
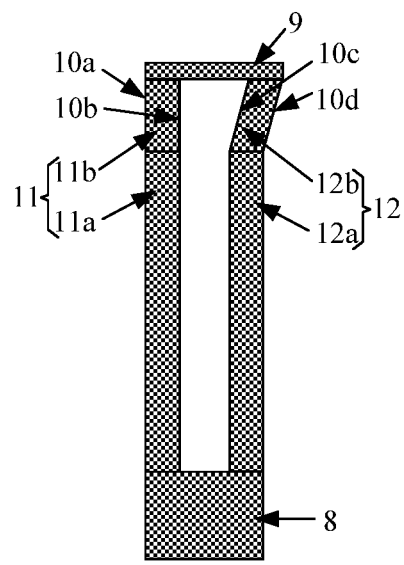
FIG. 6 is a top view of another electrode for display according to an embodiment of the present disclosure.

FIG. 6 is a top view of another electrode for display according to an embodiment of the present disclosure. As shown in FIG. 6, both the left side edge 10a and the right side edge 10b of the end electrode 11b of the first display electrode 11 are line segments whose extending directions are parallel to the second direction; both the left side edge 10c and the right side edge 10d of the end electrode 12b in the second display electrode 12 are line segments whose extending directions intersect the second direction. That is, the side edge 10a is not parallel to the side edge 10c and the side edge 10d, and the side edge 10b is not parallel to the side edge 10c and the side edge 10d; the left side edge 10c of the end electrode 12b of the second display electrode 12 forms a corner with the left side edge of the body electrode 12a of the second display electrode 12, and the right side edge 10d of the end electrode 12b of the second display electrode 12 forms a corner with the right side edge of the body electrode 12a of the second display electrode 12.

Figure 7:
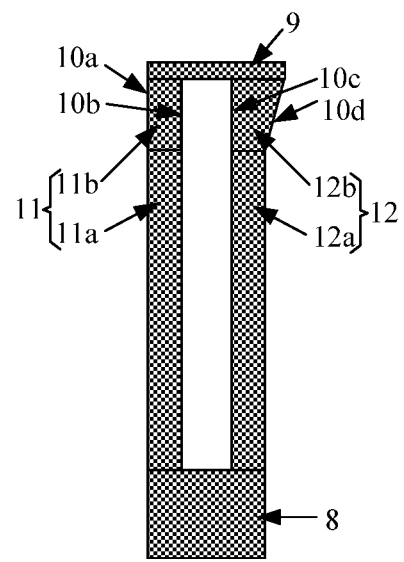
FIG. 7 is a top view of still another electrode for display according to an embodiment of the present disclosure.

FIG. 7 is a top view of still another electrode for display according to an embodiment of the present disclosure. As shown in FIG. 7, both the left side edge 10a and the right side edge 10b of the end electrode 11b of the first display electrode 11 are line segments whose extending directions are parallel to the second direction; the left side edge 10c of the end electrode 12b of the second display electrode 12 is a line segment whose extending direction is parallel to the second direction, and the right side edge 10d of the end electrode 12b of the second display electrode 12 is a line segment whose extending direction intersects the second direction; that is, the side edge 10d is not parallel to the other three side edges 10a, 10b, 10c; the right side edge of the end electrode 12b of the second display electrode 12 forms a corner with the left side edge of the body electrode 12a of the second display electrode 12.

It should be noted that, the above case where the first direction is a horizontal direction, the second direction is a vertical direction, and the first direction is perpendicular to the second direction is merely exemplary, and does not limit the technical solution of the present disclosure. In the embodiment of the present disclosure, it is only necessary to ensure that the first direction intersects with the second direction.

The trace mura test is performed on the end region where the end electrode is located in the slit electrode shown in FIG. 3 and FIGS. 5-7, the time during which the liquid crystal molecules in the end region of the slit electrode in the related art shown in FIG. 3 are restored to the prior-to-pressing state after being pressed is 13 ms, the time during which the liquid crystal molecules in the end region of the slit electrode in the embodiment of the present disclosure shown in FIG. 5 are restored to the prior-to-pressing state after being pressed is 12.7 ms, the time during which the liquid crystal molecules in the end region of the slit electrode in the embodiment of the present disclosure shown in FIG. 6 are restored to the prior-to-pressing state after being pressed is 12.5 ms, and the time during which the liquid crystal molecules in the end region of the slit electrode in the embodiment of the present disclosure shown in FIG. 7 are restored to the prior-to-pressing state after being pressed is 12.8 ms. It can thus been seen that, the technical solution of the present disclosure can effectively alleviate the trace mura of the end region in the slit electrode.

Referring to FIGS. 5 to 7, in some embodiments, the second connection electrode 9 is arranged between portions of the end electrodes, which are away from the body electrodes, of adjacent two of the display electrodes, and the second connection electrode 9 is connected with one ends of the end electrodes away from the body electrodes. The provision of the second connection electrode 9 can effectively reduce the overall resistance of the display electrode.

Figure 8:
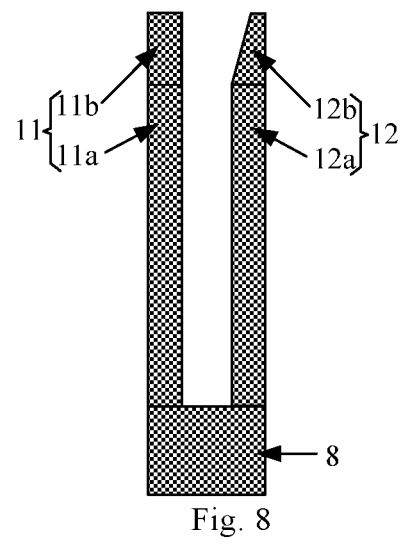
FIGS. 8-10 are top views of three different electrodes for display according to embodiments of the present disclosure.
Figure 9:
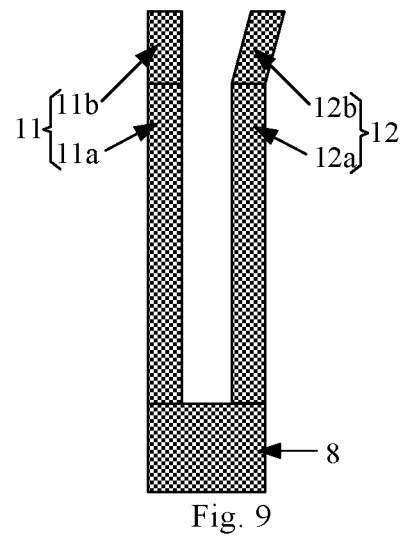
Figure 10:
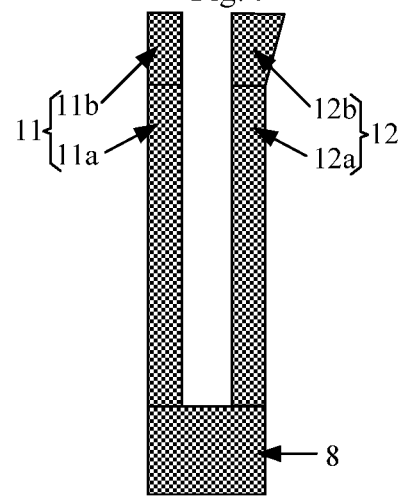

FIGS. 8 to 10 are top views of three different electrodes for display according to an embodiment of the present disclosure. As shown in FIGS. 8 to 10, unlike FIGS. 5 to 7, the electrodes for display shown in FIGS. 8 to 10 are not provided with the second connection electrode 9 therein, that is, portions, which are away from the body electrodes 11a, 12a, of the end electrodes 11b, 12b of adjacent two display electrodes 11, 12 are formed as an opening.

In the embodiment of the present disclosure, by setting the portions, which are away from the body electrodes, of the end electrodes of the two adjacent display electrodes as an opening, the electric field strength in the end regions can be reduced, the deflection angle of the liquid crystal molecules in the end regions is reduced, and the deflection difference of the liquid crystal molecules in the end regions is reduced; the uniformity in the deflection directions of the liquid crystal molecules in the region can be improved; when the end region is pressed, the liquid crystal molecules in the end region tend to have uniform deflection directions, so that liquid crystal accumulation does not occur, and the trace mura can be effectively alleviated.

The trace mura test is performed on the end region where the end electrode is located in the slit electrode shown in FIGS. 8 to 10, the time during which the liquid crystal molecules in the end region of the slit electrode shown in FIG. 8 are restored to the prior-to-pressing state after being pressed is 11.7 ms, the time during which the liquid crystal molecules in the end region of the slit electrode shown in FIG. 9 are restored to the prior-to-pressing state after being pressed is 11.5 ms, and the time during which the liquid crystal molecules in the end region of the slit electrode in the embodiment of the present disclosure shown in FIG. 10 are restored to the prior-to-pressing state after being pressed is 11.9 ms. It can thus been seen that, compared with the technical solutions shown in FIGS. 5 to 7 in which the second connection electrode 9 is provided, the trace mura in the end region of the slit electrode can be further alleviated by the design of omitting the second connection electrode 9 to form an opening in the embodiments of the present disclosure.

Based on the foregoing, it can be seen that the trace mura in the end region of the slit electrode can be effectively alleviated by adopting the corner design for the end region of the display electrode and adopting the opening design for the end regions of adjacent display electrodes.

Figure 11:
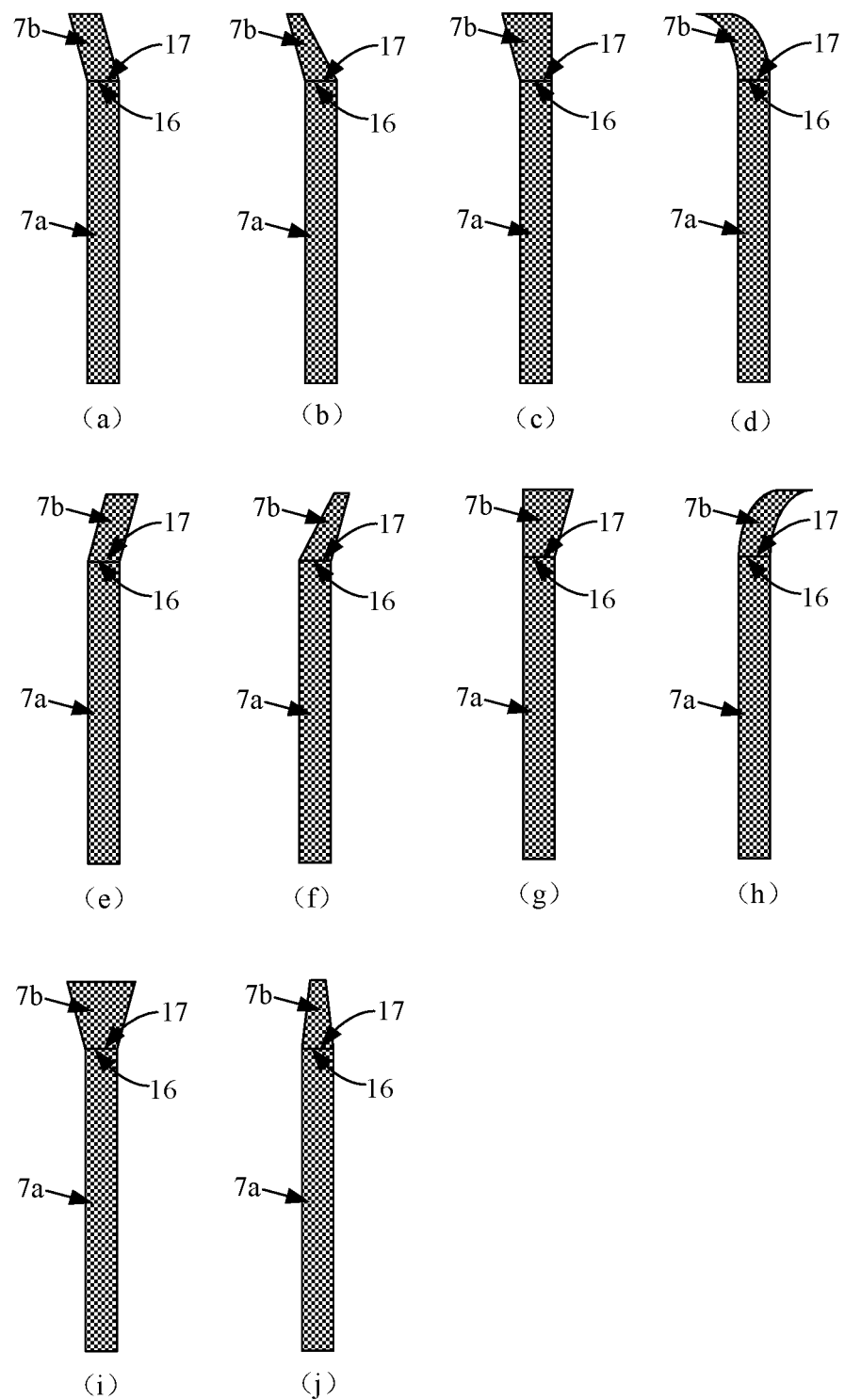
FIG. 11 is a different top view of a single display electrode in an embodiment of the present disclosure.

FIG. 11 is a different top view of a single display electrode in an embodiment of the present disclosure. As shown in FIG. 11, for the display electrodes shown in parts (a) and (b) of FIG. 11, the left and right side edges both are designed to have a corner and turn to the left, for the display electrode shown in part (c) of FIG. 11, only the left side edge is designed to have a corner and turn to the left, for the display electrode shown in part (d) of FIG. 11, the left and right side edges are designed to have a corner rounded and turning to the left, the display electrodes shown in parts (c) to (h) of FIG. 11 are obtained by horizontally turning over those shown in parts (a) to (d) of FIG. 11, respectively, for the display electrode shown in part (i) of FIG. 11, the left and right side edges are designed to have a corner, with the left side edge turning to the left and the right side edge turning to the right, and for the display electrode shown in part (j) of FIG. 11, the left and right side edges are designed to have a corner, with the left side edge turning to the right and the right side edge turning to the left.

In some embodiments, each display electrode of the electrode for display may have a shape independently selected from the shapes of the display electrodes shown in FIG. 11. It should be noted that, each display electrode of the electrode for display according to an embodiment of the present disclosure may also have other shapes, which will not be listed here one by one.

Continue to refer to the parts (a) to (j) of FIG. 11, in some embodiments, in a same display electrode, a boundary 17 of the end electrode 7b close to one end of the body electrode 7a and a boundary 16 of the body electrode 7a close to one end of the end electrode 7b completely overlap. This arrangement is to ensure that the electric field strength around an end of the end electrode 7b close to the body electrode 7a is equal or approximately equal to the electric field strength around an end of the body electrode 7a close to the end electrode 7b, so as to avoid the disordered electric field strength in a region where the end electrode 7b and the body electrode 7a are connected, thereby avoiding the disordered arrangement of liquid crystal molecules in the region, effectively ensuring the display effect of the pixel region and alleviating the trace mura.

Figure 12:
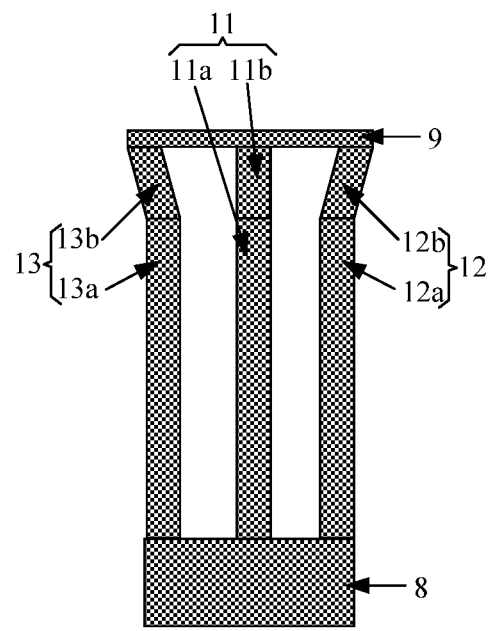
FIG. 12 is a top view of another electrode for display according to an embodiment of the present disclosure.

FIG. 12 is a top view of another display electrode according to an embodiment of the present disclosure. As shown in FIG. 12, the at least two display electrodes include not only the first display electrode 11 and the second display electrode 12, but also a third display electrode 13. The second display electrode 12 and the third display electrode 13 are respectively located on different sides of the first display electrode 11; the body electrode 11a of the first display electrode 11 and the body electrode 13a of the third display electrode 13 are parallel in the first direction with a second preset pitch; among two side edges of the end electrode 11b of the first display electrode 11 that are opposite in the first direction and two side edges of the end electrode 13b of the third display electrode 13 that are opposite in the first direction, at least two side edges of the four side edges are unparallel; a minimum distance in the first direction between one side edge of the end electrode 11b of the first display electrode 11 close to the third display electrode 13 and one side edge of the end electrode 13b of the third display electrode 13 close to the first display electrode 11 is greater than or equal to the second preset pitch.

In some embodiments, a shape of the end electrode 12b of the second display electrode 12 and a shape of the end electrode 13b of the third display electrode 13 are axisymmetric with respect to an axis of symmetry extending in a second direction, which intersects the first direction In the case shown in FIG. 12, the case where the first direction is a horizontal direction, the second direction is a vertical direction, and the first direction is perpendicular to the second direction is merely exemplary, and does not limit the technical solution of the present disclosure.

In some embodiments, the end electrode 11b of the first display electrode 11 has a shape that is an axisymmetric pattern with respect to an axis of symmetry extending in the second direction; the shape of the end electrode 12b of the second display electrode 12 and the shape of the end electrode 13b of the third display electrode 13 are axisymmetric with respect to the axis of symmetry of the end electrode 11b of the first display electrode 11. In this case, the overall shape formed by all the display electrodes is axisymmetric, which can effectively improve the uniformity of electric field distribution in the pixel region.

It should be noted that when the side edge of the end electrode and a corresponding side edge of the body electrode connected to the end electrode form a corner, the liquid crystal molecules near the corner are deflected toward the turning direction of the corner, and in this case, difference luminances may be observed for the corner region from one side of the corner, to which the corner turns, and the other side of the corner that is opposite to the one side, that is, the observed luminances at different viewing angles are different. In the embodiment of the present disclosure, the shape of the end electrode 12b of the second display electrode 12 and the shape of the end electrode 13b of the third display electrode 13 are axisymmetric with respect to the axis of symmetry of the end electrode 11b of the first display electrode 11, so that when the entire end region is observed respectively from the left side and the right side of the axis of symmetry, the observed luminances are the same, that is, the observed luminances at different viewing angles are the same, thereby improving the product performance.

In some embodiments, a distance, in the first direction, between a side edge of the end electrode 11b of the first display electrode 11 close to the second display electrode 12 and a side edge of the end electrode 12b of the second display electrode 12 close to the first display electrode 11 gradually increases in a direction away from the body electrodes 11a, 12a.

In a gap region between the end electrode 11b of the first display electrode 11 and the end electrode 12b of the second display electrode 12, the electric field strength in the gap region is gradually reduced along the direction away from the body electrodes 11a, 12a, so that the deflection directions of the liquid crystal molecules in the gap region are smoothly changed, which facilitates alleviating trace mura.

A distance, in the first direction, between a side edge of the end electrode 11b of the first display electrode 11 close to the third display electrode 13 and a side edge of the end electrode 13b of the third display electrode 13 close to the first display electrode 11 gradually increases in a direction away from the body electrodes 11a, 13a.

In a gap region between the end electrode 11b of the first display electrode 11 and the end electrode 13b of the third display electrode 13, the electric field strength in the gap region is gradually reduced along the direction away from the body electrodes 11a, 13a, so that the deflection directions of the liquid crystal molecules in the gap region are smoothly changed, which facilitates alleviating trace mura.

In some embodiments, the end electrode 11b of the first display electrode 11 has a shape of rectangle, the end electrode 12b of the second display electrode 12 has a shape of parallelogram and turns to the right, and the end electrode 13b of the third display electrode 13 has a shape of parallelogram and turns to the left. The width of the end electrode of each display electrode in the first direction is constant.

Figure 13:
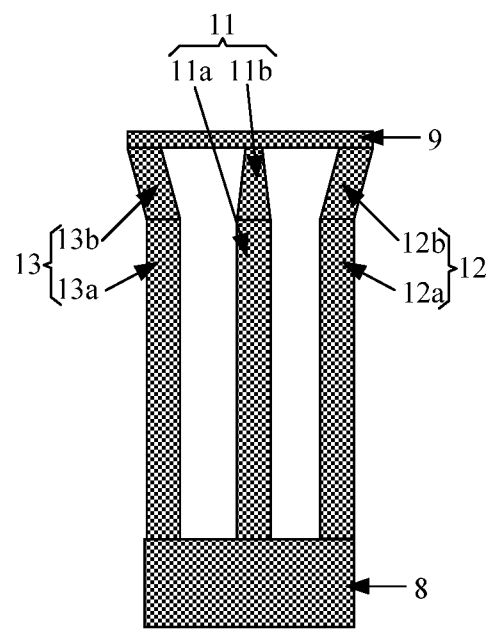
FIG. 13 is a top view of another electrode for display according to an embodiment of the present disclosure.

FIG. 13 is a top view of another electrode for display according to an embodiment of the present disclosure. As shown in FIG. 13, unlike the case where the width of the end electrode of each display electrode in the first direction is constant as shown in FIG. 12, in the electrode for display shown in FIG. 13, the end electrode 11b of the first display electrode 11 is a bar-shaped electrode, and the width of the end electrode 11*b* in the first direction is gradually reduced along the second direction and in the direction away from the body electrode.

In some embodiments, the end electrode 11*b* of the first display electrode 11 has a shape of inverted trapezoid, or inverted triangle (not shown).

In some embodiments, in the second display electrode 12 and the third display electrode 13, the end electrodes 12*b*, 13*b* are bar-shaped electrodes each having a center line that is a line segment (e.g., the cases shown in parts (a) to (c) and (c) to (g) of FIG. 11) or an arc (e.g., the case shown in parts (d) and (h) of FIG. 11).

In some embodiments, in the second display electrode 12 and the third display electrode 13, center lines (each being a line connecting the center points in the width direction, which determines the turning direction of the end electrode) of the end electrodes 12*b*, 13*b* are shaped as line segments whose extending directions intersect the second direction. That is, the turning direction of the end electrode 12*b* of the second display electrode 12 is different from the turning direction of the end electrode 13*b* of the third display electrode 13. In the case shown in FIG. 13, the end electrode 12*b* of the second display electrode 12 turns to the right, and the end electrode 13*b* of the third display electrode 13 turns to the left.

Figure 14:
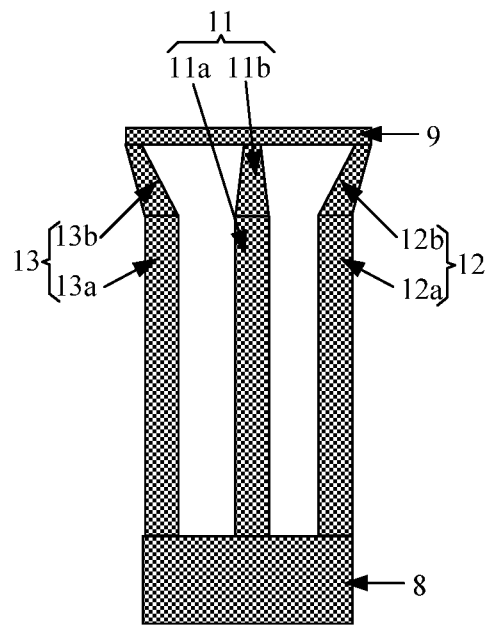
FIG. 14 is a top view of another electrode for display according to an embodiment of the present disclosure.

FIG. 14 is a top view of another electrode for display according to an embodiment of the present disclosure. As shown in FIG. 14, unlike the case where the widths of the end electrodes 12*b*, 13*b* of the second display electrode 12 and the third display electrode 13 are constant as shown in FIG. 13, the widths of the end electrodes 12*b*, 13*b* of the second display electrode 12 and the third display electrode 13 in the case shown in FIG. 14 are changed. Specifically, in the second display electrode 12 and the third display electrode 13, the widths of the end electrodes 12*b*, 13*b* in the first direction are gradually reduced in the second direction and in the direction away from the body electrodes 12*a*, 13*a*.

In the embodiment of the present disclosure, by gradually reducing the widths of the end electrodes of the display electrodes, it is possible to gradually reduce, in the direction away from the body electrode, the electric field strength within the gap region between adjacent end electrodes on the one hand; on the other hand, the overall electric field strength in the gap region can be reduced. Based on the foregoing analysis, it can be seen that the trace mura of the end region in the slit electrode can be effectively alleviated by controlling the electric field strength to be gradually changed and reducing the electric field strength of the end region.

Figure 15:
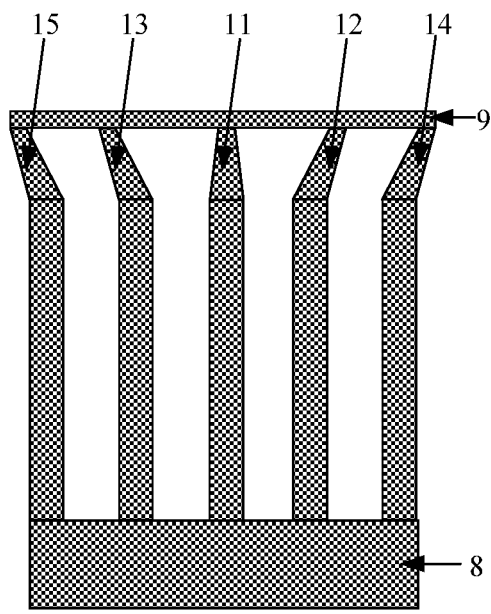
FIG. 15 is a top view of another electrode for display according to an embodiment of the present disclosure.

FIG. 15 is a top view of another electrode for display according to an embodiment of the present disclosure, and as shown in FIG. 15, the at least two display electrodes include not only the first display electrode 11 to the third display electrode 13, but also at least one fourth display electrode 14 and at least one fifth display electrode 15.

The fourth display electrode 14 has the same shape as the second display electrode 12, and the fifth display electrode 15 has the same shape as the third display electrode 13; and the fourth display electrode 14 is at a side of the second display electrode 12 away from the first display electrode 11, and the fifth display electrode 15 is at a side of the third display electrode 13 away from the first display electrode 11.

It should be noted that FIG. 15 shows only one fourth display electrode 14 and one fifth display electrode 15 by way of example. In the embodiment of the present disclosure, the numbers of the fourth display electrode(s) 14 and the fifth display electrode(s) 15 may also be multiple, the multiple fourth display electrodes 14 are arranged in parallel along the first direction, and the multiple fifth display electrodes 15 are arranged in parallel along the first direction, which is not shown in the drawings.

In some embodiments, the number of the fourth display electrode(s) 14 is equal to the number of the fifth display electrode(s) 15, and the fourth display electrode(s) 14 and the fifth display electrode(s) 15 are axisymmetric with respect to the axis of symmetry of the end electrode 11*b* of the first display electrode 11. In this case, the overall shape formed by all the display electrodes is axisymmetric, so that the uniformity of electric field distribution in the pixel region can be effectively improved.

It should be noted that, under the condition that the size of the pixel opening and the width of the body electrode of the display electrode are fixed, the larger the number of the display electrodes is, the smaller the distance between the adjacent display electrodes is, the stronger the electric field strength in the gap region between adjacent display electrodes is, the higher the maximum brightness of the whole pixel region is, and the better the display performance of the product is; however, the trace mura will be worse because of the increase of the electric field strength in the region between the adjacent end electrodes. Therefore, in practical applications, the number of the display electrodes can be properly selected according to the required display performance of the product and trace mura performance.

Figure 16:
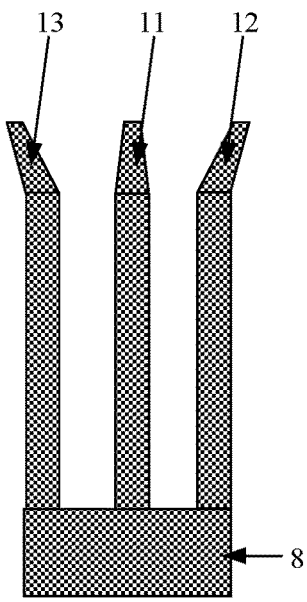
FIGS. 16 and 17 are top views of two electrodes for display according to an embodiment of the present disclosure.
Figure 17:
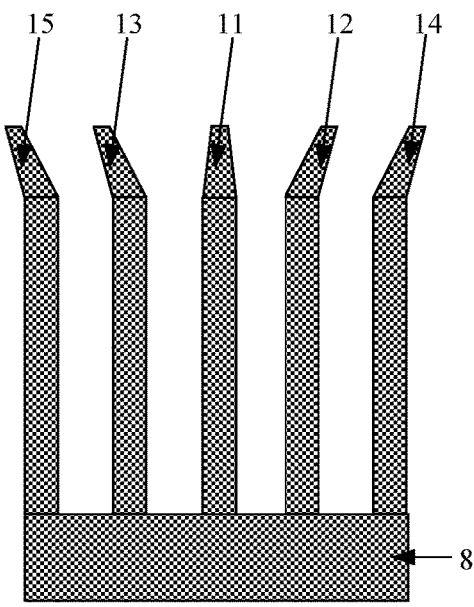

FIGS. 16 and 17 are top views of two electrodes for display according to an embodiment of the present disclosure. As shown in FIGS. 16 and 17, the number of display electrodes 11, 12, and 13 of the electrode for display shown in FIG. 16 is three, and the number of display electrodes 11, 12, 13, 14, and 15 of the electrode for display shown in FIG. 17 is five. Unlike the electrodes for display including the second connection electrode 9 as shown in FIGS. 12 to 15, the electrodes for display shown in FIGS. 16 and 17 do not include the second connection electrode 9, that is, portions, which are away from the body electrodes, of the end electrodes of adjacent two display electrodes are formed as an opening.

In the embodiment of the present disclosure, by setting the portions of the end electrodes of adjacent two display electrodes that are away from the body electrodes as an opening, the electric field strength in the end region can be reduced, the deflection angles of the liquid crystal molecules in the end region can be reduced, and the uniformity of the deflection directions of the liquid crystal molecules in the region can be improved.

It should be noted that, the electrode for display according to the embodiments of the present disclosure may be used as a whole or a part of one pixel electrode/common electrode in the display substrate. For example, any one of the electrodes for display in FIGS. 5 to 10 and 12 to 17 may be used as a pixel electrode or a common electrode independently, or a plurality of electrodes for display may be spliced and combined to serve as one pixel electrode or one common electrode, which all fall within the scope of the present disclosure.

In a second aspect, an embodiment of the present disclosure further provides a display substrate, including: a base substrate, a first electrode and a second electrode, the second electrode being at a side of the first electrode away from the base substrate and being the electrode for display according to any one of the above embodiments; one of the first electrode and the second electrode is a common electrode, and the other is a pixel electrode.

Referring to FIG. 2, the first electrode in the case shown in FIG. 2 is a common electrode, the second electrode is a pixel electrode, and the pixel electrode is a slit electrode and is implemented as the electrode for display according to an embodiment of the present disclosure.

Figure 18:
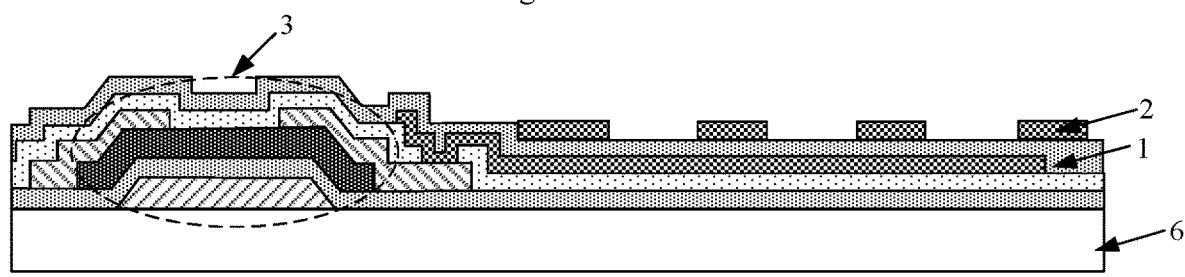
FIG. 18 is another cross-sectional view of the pixel region shown in FIG. 1.

FIG. 18 is another cross-sectional view of the pixel region shown in FIG. 1. As shown in FIG. 18, unlike the case shown in FIG. 2, the first electrode in the case shown in FIG. 18 is a pixel electrode, the second electrode is a common electrode, and the common electrode is a slit electrode and is implemented as the electrode for display according to an embodiment of the present disclosure.

It should be known to those skilled in the art that the pixel electrode may be a plate electrode or a slit electrode, and so is the common electrode; and the up-down order of the pixel electrode and the common electrode may be reversed, but the upper electrode is a slit electrode, and the lower electrode may be a plate electrode or a slit electrode. In the embodiment of the present disclosure, at least the upper slit electrode is implemented as the electrode for display according to an embodiment of the present disclosure; in some embodiments, when the lower electrode is also a slit electrode, the lower electrode may also be the electrode for display according to an embodiment of the present disclosure.

The embodiment of the present disclosure further provides a display device, including: the display substrate according to the above embodiments, a counter substrate arranged opposite to the display substrate, and a liquid crystal layer between the display substrate and the counter substrate.

The display device according to an embodiment of the present disclosure may be any product or component with a display function, such as a liquid crystal panel, a mobile phone, a tablet computer, a television, a display, a notebook computer, a digital photo frame, a navigator and the like. The display device according to the embodiment of the present disclosure has beneficial effects of the electrode for display according to the embodiment of the present disclosure, and reference may be made to the specific description of the electrode for display in the above embodiments, which will be not described herein again.

It will be understood that the forgoing embodiments are merely exemplary embodiments used for describing the principle of the present disclosure, but the present disclosure is not limited thereto. Those of ordinary skill in the art may make various variations and improvements without departing from the spirit and essence of the present disclosure, and these variations and improvements shall also fall into the protection scope of the present disclosure.

What is claimed is:

1. A display device, comprising: a display substrate, a counter substrate arranged opposite to the display substrate, and a liquid crystal layer between the display substrate and the counter substrate,
wherein the display substrate comprises a base substrate, a first electrode and a second electrode, wherein the second electrode is at a side of the first electrode away from the base substrate, and comprises at least two display electrodes arranged at an interval along a first direction and a first connection electrode connected with one end of each display electrode, wherein the display electrodes each comprises a body electrode and an end electrode, one end of the body electrode is connected with the first connection electrode, and the other end of the body electrode is connected with the end electrode, the at least two display electrodes comprise a first display electrode and a second display electrode, and the body electrode of the first display electrode is parallel to the body electrode of the second display electrode in the first direction with a first preset pitch,
among two side edges of the end electrode of the first display electrode that are opposite in the first direction and two side edges of the end electrode of the second display electrode that are opposite in the first direction, at least two side edges are unparallel, and
a minimum distance in the first direction between one side edge of the end electrode of the first display electrode close to the second display electrode and one side edge of the end electrode of the second display electrode close to the first display electrode is greater than or equal to the first preset pitch, and
one of the first electrode and the second electrode is a common electrode, and the other of the first electrode and the second electrode is a pixel electrode,
wherein the at least two display electrodes further comprise a third display electrode, and the second display electrode and the third display electrode are at different sides of the first display electrode, respectively;
the body electrode of the first display electrode and the body electrode of the third display electrode are parallel in the first direction with a second preset pitch;
among two side edges of the end electrode of the first display electrode that are opposite in the first direction and two side edges of the end electrode of the third display electrode that are opposite in the first direction, at least two side edges are unparallel; and
a minimum distance in the first direction between one side edge of the end electrode of the first display electrode close to the third display electrode and one side edge of the end electrode of the third display electrode close to the first display electrode is greater than or equal to the second preset pitch,
wherein a shape of the end electrode of the second display electrode and a shape of the end electrode of the third display electrode are axisymmetric with respect to an axis of symmetry extending in a second direction, the second direction intersecting the first direction,
wherein the end electrode of the first display electrode has a shape that is an axisymmetric pattern with respect to an axis of symmetry extending in the second direction; and
the shape of the end electrode of the second display electrode and the shape of the end electrode of the third display electrode are axisymmetric with respect to the axis of symmetry of the end electrode of the first display electrode,
wherein the end electrodes of the second display electrode and the third display electrode are bar-shaped electrodes each having a center line that is a line segment whose extending direction intersects the second direction.

2. The display device of claim 1, wherein a distance, in the first direction, between a side edge of the end electrode of the first display electrode close to the second display electrode and a side edge of the end electrode of the second display electrode close to the first display electrode gradually increases in a direction away from the body electrodes of the first and second display electrodes; and
a distance, in the first direction, between a side edge of the end electrode of the first display electrode close to the third display electrode and a side edge of the end electrode of the third display electrode close to the first display electrode gradually increases in a direction away from the body electrodes of the first and third display electrodes.

3. The display device of claim 1, wherein the end electrode of the first display electrode is a bar-shaped electrode, and a width of the end electrode of the first display electrode in the first direction is constant or gradually reduced in a direction away from the body electrode of the first display electrode along the second direction.

4. The display device of claim 3, wherein the end electrode of the first display electrode has a shape of rectangle, inverted trapezoid, or inverted triangle.

5. The display device of claim 1, wherein a width of each of the end electrodes of the second and third display electrodes in the first direction is constant or gradually decreased in a direction away from the body electrodes of the second and third display electrodes along the second direction.

6. The display device of claim 1, wherein the at least two display electrodes further comprise at least one fourth display electrode having the same shape as the second display electrode and at least one fifth display electrode having the same shape as the third display electrode; and
the fourth display electrode is at a side of the second display electrode away from the first display electrode, and the fifth display electrode is at a side of the third display electrode away from the first display electrode.

7. The display device of claim 6, wherein the number of the at least one fourth display electrode is equal to the number of the at least one fifth display electrode, and the at least one fourth display electrode and the at least one fifth display electrode are axisymmetric with respect to the axis of symmetry of the end electrode of the first display electrode.

8. The display device of claim 1, wherein the second electrode is an electrode for liquid crystal display.

9. The display device of claim 1, wherein in a same display electrode, a boundary of the end electrode close to one end of the body electrode and a boundary of the body electrode close to one end of the end electrode completely overlap.

10. The display device of claim 1, wherein portions, which are away from the body electrodes of adjacent two of the display electrodes, of the end electrodes of the adjacent two of the display electrodes are formed as an opening.

11. The display device of claim 1, wherein a second connection electrode is arranged between portions, which are away from the body electrodes, of the end electrodes of adjacent two of the display electrodes, and the second connection electrode is connected with one ends of the end electrodes away from the body electrodes.

12. The display device of claim 1, wherein a second connection electrode is arranged between portions, which are away from the body electrodes, of the end electrodes of adjacent two of the display electrodes, and the second connection electrode is connected with one ends of the end electrodes away from the body electrodes.

13. A display device, comprising: a display substrate, a counter substrate arranged opposite to the display substrate, and a liquid crystal layer between the display substrate and the counter substrate,
wherein the display substrate comprises a base substrate, a first electrode and a second electrode, wherein the second electrode comprises at least two display electrodes arranged at an interval along a first direction and a first connection electrode connected with one end of each display electrode, wherein the display electrodes each comprises a body electrode and an end electrode, one end of the body electrode is connected with the first connection electrode, and the other end of the body electrode is connected with the end electrode,
the at least two display electrodes comprise a first display electrode and a second display electrode, and the body electrode of the first display electrode is parallel to the body electrode of the second display electrode in the first direction with a first preset pitch,
among two side edges of the end electrode of the first display electrode that are opposite in the first direction and two side edges of the end electrode of the second display electrode that are opposite in the first direction, at least two side edges are unparallel, and
a minimum distance in the first direction between one side edge of the end electrode of the first display electrode close to the second display electrode and one side edge of the end electrode of the second display electrode close to the first display electrode is greater than or equal to the first preset pitch, and
the first electrode is a common electrode and the second electrode independently serves as one pixel electrode, or, the first electrode is a pixel electrode and the second electrode independently serves as one common electrode,
wherein the at least two display electrodes further comprise a third display electrode, and the second display electrode and the third display electrode are at different sides of the first display electrode, respectively;
the body electrode of the first display electrode and the body electrode of the third display electrode are parallel in the first direction with a second preset pitch;
among two side edges of the end electrode of the first display electrode that are opposite in the first direction and two side edges of the end electrode of the third display electrode that are opposite in the first direction, at least two side edges are unparallel; and
a minimum distance in the first direction between one side edge of the end electrode of the first display electrode close to the third display electrode and one side edge of the end electrode of the third display electrode close to the first display electrode is greater than or equal to the second preset pitch,
wherein a shape of the end electrode of the second display electrode and a shape of the end electrode of the third display electrode are axisymmetric with respect to an axis of symmetry extending in a second direction, the second direction intersecting the first direction,
wherein the end electrode of the first display electrode has a shape that is an axisymmetric pattern with respect to an axis of symmetry extending in the second direction; and
the shape of the end electrode of the second display electrode and the shape of the end electrode of the third display electrode are axisymmetric with respect to the axis of symmetry of the end electrode of the first display electrode,
wherein the end electrodes of the second display electrode and the third display electrode are bar-shaped electrodes each having a center line that is a line segment whose extending direction intersects the second direction.

14. The display device of claim 13, wherein a second connection electrode is arranged between portions, which are away from the body electrodes, of the end electrodes of adjacent two of the display electrodes, and the second connection electrode is connected with one ends of the end electrodes away from the body electrodes.

\* \* \* \* \*